Figure 3:
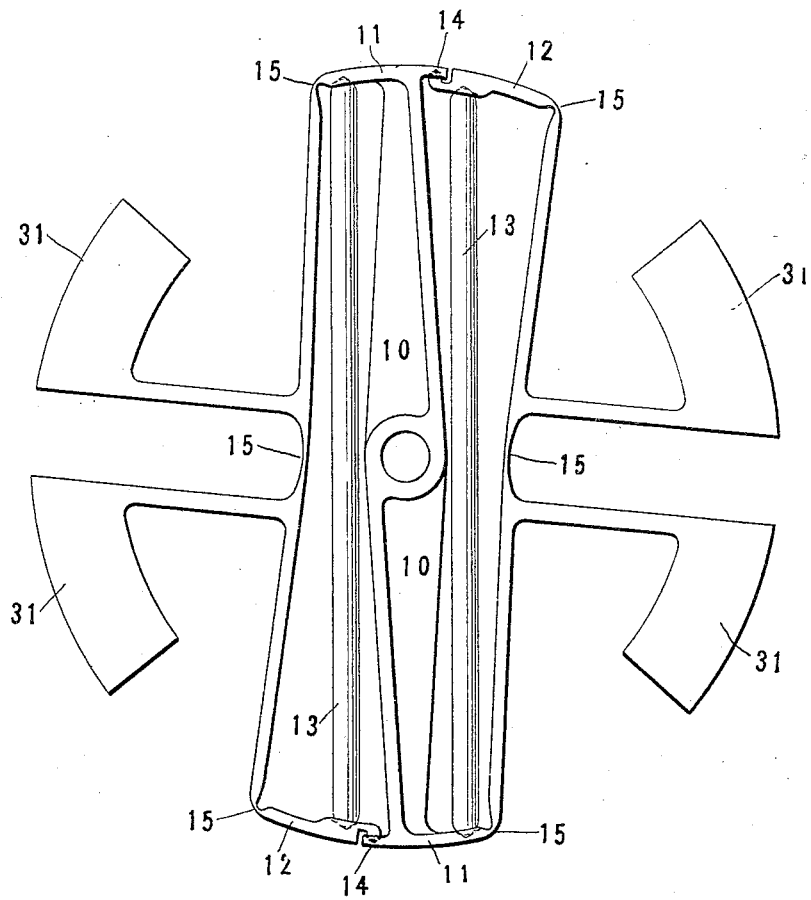

F. ECAUBERT.
COMPENSATING BALANCE WHEEL.
APPLICATION FILED NOV. 29, 1907.
965,505.
Patented July 26, 1910.
3 SHEETS—SHEET 1.
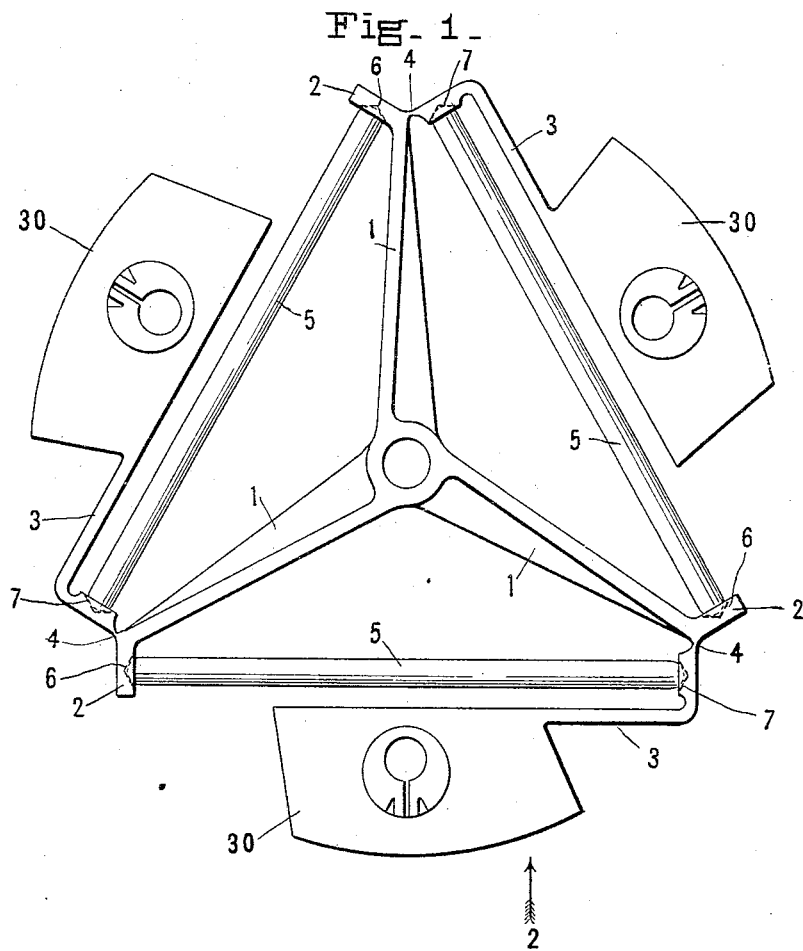
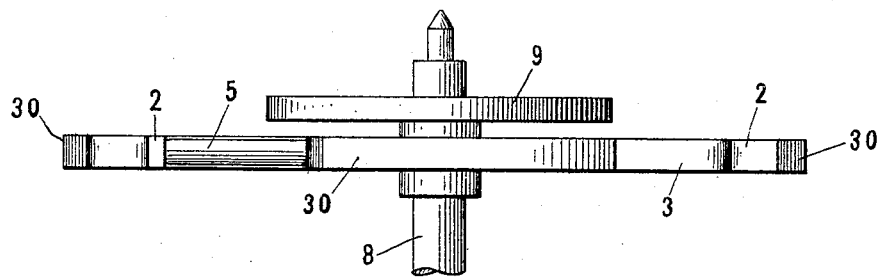
WITNESSES
J. Clyde Ripley.
R. L. Stillson.
INVENTOR
Frederic Ecaubert,
BY
Axel V. Beeken
ATTORNEY

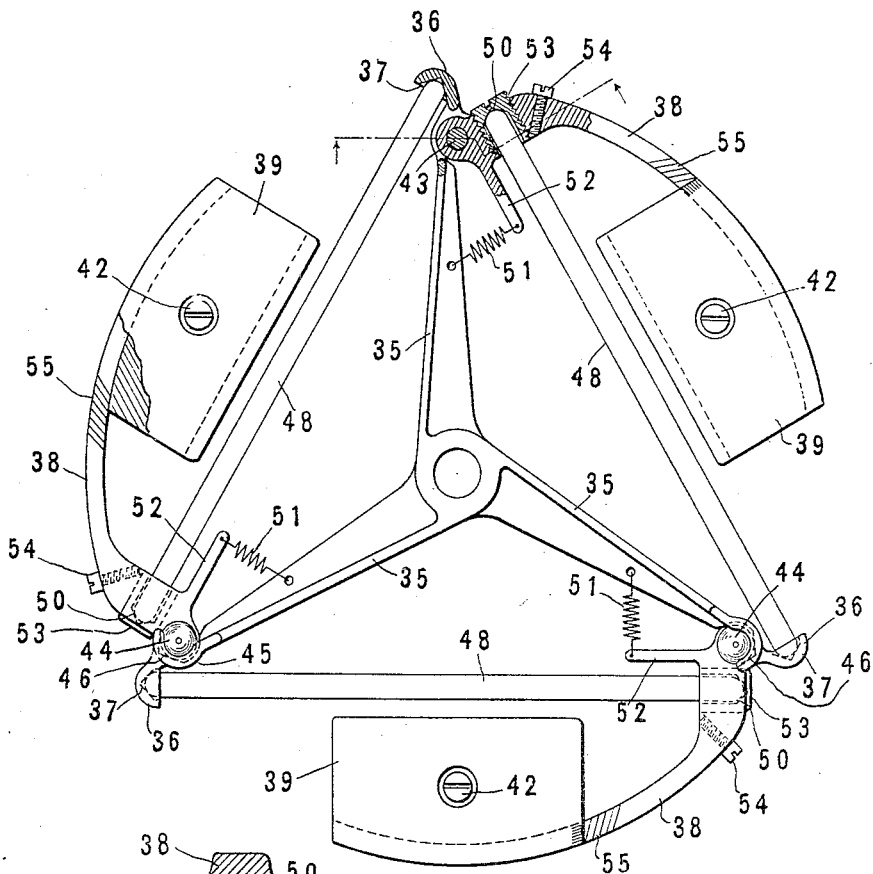

UNITED STATES PATENT OFFICE.

FREDERIC ECAUBERT, OF NEW YORK, N. Y.

COMPENSATING BALANCE-WHEEL.

965,505.  Specification of Letters Patent.  Patented July 26, 1910.

Application filed November 29, 1907. Serial No. 404,255.

*To all whom it may concern:*

Be it known that I, FREDERIC ECAUBERT, a citizen of the United States of America, and a resident of the borough of Brooklyn, county of Kings, city of New York, State of New York, have invented certain new and useful Improvements in Compensating Balance-Wheels, of which the following is a specification.

The present invention relates generally to escapement regulators, and has more particularly, though not exclusively, reference to a compensating balance wheel.

The main object of the invention is the production of a structure which will compensate in fact for temperature induced variations, that is; a structure that will give enough compensation to completely neutralize temperature induced variations.

In the well known compensating balance wheels which consist of two strips of metal soldered together, the passive member, that is the member having the low co-efficient of expansion is bent forcibly by the active member, that is the member having the relatively high co-efficient of expansion. By the word "bent" as here used, it is meant to indicate that the member is forcibly bent beyond its limit of elasticity, the active member being depended upon to forcibly pull it back again or unbend it. This arrangement is obviously objectionable since the metal can not be depended upon always to take the same path under varying contractions and expansions. It further has the effect that the solder breaks and hence the passive member will not return to its original position.

One of the features of the present invention resides in the fact that the weight carrying lever is pivotally connected to a passive and active member and is held under spring pressure against the passive member and moved only within the limit of elasticity of such spring pressure when compensating for temperature induced variations. The spring pressure may be effected by means of a separate coiled or other spring connecting the weight carrying lever to the body of the balance wheel, or as shown in one of the forms herein, the weight carrying lever may be resilient in itself by having a resilient portion at one or more points. Furthermore this resilient portion may connect it with the active member and have the function of a pivot. The weight carrying lever is pivotally connected to the passive member by resting upon the same and by holding it in contact by spring pressure. Preferably the passive member is loosely interposed between the active member and the weight carrying lever, the spring pressure exerted through the said lever serving to hold the passive member in position against the active member.

In the well known compensating balance wheel above referred to, the bending action takes place throughout the whole length of the two strips of metal soldered together and may be likened to the action of numerous wedges. It is obvious that the exact path of movement cannot be accurately ascertained with this construction since the bending may take place at any point and may vary at different times under different temperatures.

One of the features of the present invention resides in having a definite pivot in order that the compensating movement may be accurately and definitely ascertained. This definite pivot is in this instance established by providing the weight carrying lever with a countersink into which extends the end of the passive member and which weight carrying lever is held in contact with the passive member by spring pressure. In ordinary watches it is convenient to connect the weight carrying lever with the active member by means of a yielding elastic or resilient portion which forms a pivot. If this resilient portion is short enough it will also constitute a substantially definite pivot with the active member. In very fine watches and especially in chronometers where a larger size of balance wheel can be used, it is preferred to have an actually definite pivotal connection as by means of complementary jaws or otherwise. In that instance, however, it is also preferred to utilize a spring pressure to hold the weight carrying lever against the passive member, and this spring pressure may then be utilized for the purpose of holding the complementary jaws on the active member and weight carrying lever in engagement. In a structure where the weight carrying lever is pivotally connected to two members having unequal co-efficients of expansion the correct location of the neutral point of the weight carrying lever has not in the prior art been recognized. It has been assumed that this point was on the pivot of the passive member. As a matter of fact it may be at some other point whose location depends upon the difference in the ratio of expansion and contraction of the two members. The error has consequently been made that if the distance between the two pivotal points of support on the active and passive members is less than the remaining length of the lever sufficient leverage will be obtained to effect the compensation. It is obvious that if the passive and active members both expand outwardly from the center of the balance wheel and the ratio of expansion is as two to one then the neutral point on the weight carrying lever will be a distance from the pivotal support on the passive member equal to the distance between the pivotal support on the active and passive members but in the opposite direction. Owing to the fact that the compensating weights have to compensate not only for variations in size of the members composing the body of the wheel but also for variations in the length of the hair or spiral spring, it will be realized that a relatively enormous amount of compensation has to be obtained in order to compensate in fact, that is, completely for temperature induced variations. Thus for instance in the balance wheels herein disclosed the actual weight of the compensating weights is eight times greater than that of the remainder of the balance wheel while the leverage is about six times greater than the short end of the lever. It is further to be noted that the nearer the neutral point of the weight carrying lever can be brought to the pivotal support on the passive member the less the difficulty in obtaining sufficient leverage. This is of the greatest importance since limitations in size and weight constitute the chief factor in solving the problem of compensation. In the present instance the parts are preferably so arranged that the expansion of the active member in one direction is employed to neutralize, either in whole or in part, the expansion of the passive member, the expansion of the active member in the opposite direction serving to effect the movement of the weight carrying lever. In this way the neutral point may be located substantially at the point of pivotal support on the passive member. Preferably this will be accomplished by making the active member in the form of a plurality of spokes, each of which spokes is provided with an abutment at its outer end extending in one direction circumferentially while a weight carrying lever is pivotally connected to the outer end of each of said spokes but extending in a circumferentially opposite direction to that of the abutment. The passive member is then interposed between the abutment of one spoke and a weight carrying lever connected to the adjacent spoke.

Assuming that the ratio of expansion of the passive and active members is as one to two and that part of the passive member interposed between the abutment and weight carrying lever is of a length substantially approximating the diameter of the balance wheel, then the expansion of one of the spokes will neutralize the expansion of the passive member while the expansion of the adjacent spoke may be utilized for the purpose of moving the weight carrying lever. In the present instance the effective load of the compensating weight is about in the proportion of forty-eight to one with reference to the effective load of the remainder of the balance wheel. This effective load is, in the present instance, obtained both by having the compensating weight of an actually greater weight namely eight to one than that of the remainder of the balance wheel and by compounding the leverage in the proportion of six to one.

Since it is only the difference between the active and passive members which can be utilized, it is important that the length of the parts constituting the passive member should be as long as possible with reference to the length of the body of the wheel which constitutes the active member, in order to obtain a sufficient amount of movement. Preferably the length of the passive member should approximate the diameter of the wheel, or at least exceed the radius. A very effective construction is obtained by arranging the parts constituting the passive member as the chords of a circle, the circle bounding the periphery of the wheel. In a preferred form, these chords form substantially a triangle the sum of whose sides approximates or exceeds twice the diameter of the wheel.

Other features of construction will appear as the specification proceeds.

In the accompanying drawings the invention is disclosed in several concrete and preferred forms, but changes of construction may of course be made without departing from the legitimate and intended scope of the invention.

In the said drawings: Figure 1 is a plan view of a balance wheel embodying my invention. Fig. 2 is an edge view looking in the direction of the arrow 2 of Fig. 1. Fig. 3 is a modification of the structure shown in Fig. 1. Fig. 4 shows the invention applied to a balance wheel used in a chronometer. Fig. 5 is a detail sectional view showing a modified form of the pivot portion of the weight carrying lever shown in Fig. 4. Fig. 6 is an end view of one of the compensating weights.

Similar characters of reference indicate corresponding parts in the several views.

Referring to Figs. 1 and 2, 1 indicates the active member which may be made of brass or phosphor bronze whose co-efficient of expansion is about eighteen, or it may be of an alloy rich in aluminum. In the present instance this active member takes the form of three spokes each of which is provided at its outer end with a rigid abutment 2 extending in one direction circumferentially and with a weight carrying lever 3 pivotally connected to the said spoke, and provided with the weights 30. In the present instance the pivot is formed by a resilient portion 4. Interposed between the abutment of one spoke and the weight carrying lever connected to the adjacent spoke is the passive member which in this case is composed of three bars or tubes 5 made of glass or other suitable material. Glass is preferred because its co-efficient of expansion is about one-half of that of brass or phosphor bronze and also because a glass bar will withstand a great deal of compression and is therefore an almost ideal material for the passive member. This passive member has one end extending into the countersink 6 on the abutment while the other end extends into the countersink 7 on the weight carrying lever and is held under compression against the abutment by the spring pressure exerted through the weight carrying lever. The three glass bars are arranged as the chords of a circle describing the circumference of the balance wheel, and form a triangle the sum of whose sides exceeds twice the diameter of the balance wheel. With this arrangement, the expansion of one of the spokes will neutralize the effect of the expansion of the glass bar resting on its abutment, while the expansion of the adjacent spoke will be utilized to effect the movement of the weight carrying lever. Or, to state it differently, the expansion of each spoke serves to neutralize the expansion of its glass bar and also to effect a movement of the weight carrying lever resting on the adjacent glass bar. The neutral point of the weight carrying lever is therefore, with this construction and with the materials having the relative co-efficients of expansion mentioned, substantially at the pivotal point on the passive member. The interposition of the glass bars in the manner described further serves to give rigidity to a structure which would otherwise be very delicate. The balance wheel is, as usual, mounted on an arbor 8 and is provided with a hair spring 9.

Referring to Fig. 3 the general arrangement is substantially the same as in Fig. 1. The active member is here composed of the two spokes 10 extending in opposite directions and each provided with an abutment 11 extending in one direction circumferentially and a weight carrying lever 12 extending in the opposite direction circumferentially and provided with the weights 31. The glass bars 13 are interposed between the abutment of one spoke and the weight carrying lever of the adjacent spoke. In this instance, however, complementary jaws 14 are formed on the weight carrying lever and the active member so as to establish a definite pivot. The spring pressure may in this instance be conveniently obtained by connecting the weight carrying lever with the abutment of the spoke as shown and by providing the said lever with the resilient portions 15. By this means when a variation in the size of the balance wheel occurs the said weight carrying lever will be moved toward or away from the center of oscillation thereby compensating for temperature induced variations.

It should be noted that in both of the forms shown the compensating movements of the weight carrying lever is always within the limit of elasticity of the resilient or spring pressure portion. It is further to be understood that the active and passive members as well as the weight carrying lever may be composed of as many parts as may be desired.

When the form shown in Fig. 3 is employed the weight carrying lever will have a normal flex toward the center of oscillation as shown so that the weights will always be moved in the direction desired. As in Fig. 1 the glass bars run as chords of a circle bounding the circumference of the wheel, and the neutral point is as before substantially at the pivot on the glass bar.

The structure in both instances is rimless, in order that all the weight possible may be put into the compensating weights.

In Figs. 4, 5 and 6 the invention is embodied in a balance wheel more particularly adapted for chronometers. In these figures 35 denotes the active member made in the form of three spokes of brass, phosphor bronze or an alloy rich in aluminum. At the outer end of each spoke is a rigid abutment 36 provided with the countersink 37. 38 denotes a weight carrying lever curved in an arc of a circle whose center is the center of oscillation. On this lever is a compensating weight 39, dovetailed at 40 to correspond to the shape of the lever, and whereby the said weight can be adjusted along the lever. By adjusting this weight it will not be brought nearer to or farther away from the center of oscillation, and hence only the amount of compensation will be varied—not the effective load. The weight is further provided with a slit 41 whereby it will spring apart when the screw 42 is loosened so that the adjustment can be made. The weight carrying lever is pivotally connected to the active member, preferably by the following means: 43 indicates a pivot pin, carried by the weight carrying lever, provided at one end with a ball 44. 45 indicates a bearing carried by the active member composed of two portions, one of which is provided with a countersink 46 adapted to receive the ball 44, and the other of which is provided with a groove 47 adapted to receive the other end of the pivot pin. The groove 47 is preferably non-cylindrical so that the pivot pin will fit loosely therein. The object of this is to make the pivot pin 43 and groove 47 touch only at two points so that they will accommodate themselves to the position assumed by the ball in the countersink. By this means lateral displacement of the ball will be prevented. Furthermore when assembling the parts it is only necessary to hang the pivot in its bearings in order to get a perfect joint. No fitting or filing is necessary. 48 indicates the passive member, which is in the form of a bar or tube of glass, interposed between the abutment of one spoke and the weight carrrying lever connected to the adjacent spoke. To this end the said abutment and weight carrying lever is provided with countersinks 37 and 50. The weight carrying lever is held in position on the passive member by means of the coiled spring 51 connecting the lug 52 of the weight carrying lever with the active member. The weight carrying lever is provided with a hollow screw 53 into which the passive member fits, and by means of which the weight can be adjusted toward and away from the center of oscillation. This screw is made hollow so as to allow as long a glass bar as possible to be used, whereby a greater amount of motion is obtained. Similarly, and for the same reason, the abutment 36 is carried substantially to the periphery of the circle bounding the balance wheel. It will be noted that with the construction here disclosed the strains imposed on the end of the spoke are balanced so that the said spoke need not be so heavy as would otherwise be necessary. In the construction shown in Fig. 4 the neutral point of the weight carrying lever is substantially at its pivotal point of support on the passive member. As near as possible to this point is mounted a weight or screw 54 which when adjusted varies the effective load, without appreciably varying the amount of compensation. In Fig. 5 is shown a slight modification in this respect. The weight carrying lever is here provided with a lug 56 which is in the plane of a line drawn between the center of oscillation and the neutral point of the lever. A weight 57 placed radially of the wheel, and in the plane of the above mentioned line, can then be adjusted to vary the effective load without varying the compensation. 55 indicates graduations on the weight carrying lever and on the weight placed at an angle to each other, whereby a very slight adjustment can be accurately measured.

It will be seen that an important advantage resides in the fact that the balance wheel is non-magnetic, if made of the material stated, namely, brass and glass, or some other material possessing the same qualities.

What is claimed is:

1. In a balance wheel, an active member, a passive member of a free length approximating the diameter of the balance wheel, and a weight carrying lever pivotally connected to the said two members for compensating for temperature induced variations in the size of the balance wheel.

2. In a balance wheel, a passive member having a relatively low co-efficient of expansion, an active member having a relatively high co-efficient of expansion arranged to support one end of the passive member so as to neutralize the latter's expansion or contraction by its own expansion or contraction in one direction, and a weight carrying lever pivotally connected to the said members and adapted to be actuated by the expansion or contraction of the active member in the opposite direction.

3. In a balance wheel, the combination of an active member comprising: a plurality of spokes each having an abutment at its outer end extending in one direction circumferentially, a weight carrying lever pivotally connected to the outer end of each of said spokes and extending circumferentially in the opposite direction from that of the abutment, and a passive member interposed between the abutment of one spoke and the weight carrying lever connected to the adjacent spoke, said passive member forming a pivotal support for the lever.

4. In a balance wheel, the combination of an active member comprising: a plurality of spokes each having an abutment at its outer end extending in one direction circumferentially, a weight carrying lever having a definite pivotal connection with the outer end of each of said spokes and provided with a resilient portion connected with the abutment on the adjacent spoke, and a passive member interposed between the abutment of one spoke and the weight carrying lever connected to the adjacent spoke, the resilient portion of the weight carrying lever serving to maintain it in contact with the passive member.

5. In a balance wheel, the combination of an active member, a passive member, a weight carrying lever having a definite pivot on the active member and resting on the passive member, and a weight carried by the weight carrying lever having a greater load than that of the said two members.

6. In a balance wheel, the combination of an active member, a passive member, a weight carrying lever having a definite pivot on the active member and resting on the passive member, the distance between the pivotal connection with the active member and the neutral point of the weight carrying lever being shorter than the remaining length of the lever.

7. In a balance wheel, the combination of an active member, a passive member, a weight carrying lever pivotally connected to said members, the distance from the pivotal connection with the active member to the neutral point of the weight carrying lever being less than the remaining length of the lever and a weight on the longer end of the weight carrying lever whose actual weight is greater than that of the two members.

8. In an escapement regulator, the combination of two members having unequal co-efficients of expansion, and a weight carrying lever pivotally connected to the said two members whose neutral point is substantially at its point of pivotal support on the member having the lower co-efficient of expansion.

9. In a balance wheel, the combination of an active and a passive member having unequal co-efficients of expansion, the co-efficient of expansion of the passive member being substantially one-half of that of the active member, and the length of the passive member approximating the diameter of the balance wheel, and a weight carrying lever pivotally connected to the said members.

10. In a balance wheel the combination of an active member, a weight carrying lever, and a passive member the free length of which is arranged as the chord of a circle describing the circumference of the wheel interposed between the active member and weight carrying lever.

11. In a balance wheel, an active member comprising a plurality of spokes, a passive member comprising a plurality of bars arranged as the sides of a triangle and interposed between adjacent spokes, and weight carrying levers extending circumferentially and pivotally connected to the spokes and bars.

12. In an escapement regulator the combination of two members having unequal coefficients of expansion, the member having the lower coefficient of expansion being longer than the radius of the wheel, said member being free from all obstruction and lengthwise expansion or movement for a distance exceeding the radius of the wheel, and a weight carrying lever connected to the said two members.

13. A balance wheel for timepieces comprising a hub, spokes radiating therefrom, extensions projected from the outer ends of the spokes in one direction, weighted levers projected from the outer ends of the spokes in the opposite direction, and resistant rods consisting of a material having a lower co-efficient of expansion than said spokes, the ends of each rod being located at practically the same distance from the wheel's center and being engaged respectively with the extension from one spoke and the lever of the next spoke adjacent to the ends of said spokes.

14. In an escapement regulator, a yielding spoke of a material of relatively great expansibility under the influence of heat, a weight connected thereto, and an unyielding member of a material of relatively less expansibility under the influence of heat interposed between two points of the spoke and forming a pivotal support around which the weight swings under the influence of the expansion and contraction of the spoke.

Signed at New York city this 12th day of November 1907.

FREDERIC ECAUBERT.

Witnesses:
   Geo. A. Marshall,
   Axel V. Beeken.